(12) United States Patent
Gerdes

(10) Patent No.: US 6,546,635 B1
(45) Date of Patent: Apr. 15, 2003

(54) VEHICLE SERVICE EQUIPMENT UTILIZING WHEEL LATERAL FORCE MEASUREMENTS

(75) Inventor: Michael D. Gerdes, St. Peters, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/965,748

(22) Filed: Sep. 28, 2001

(51) Int. Cl.[7] .............................................. G01B 5/255
(52) U.S. Cl. ..................................... 33/203.13; 73/146
(58) Field of Search ............................. 33/203, 203.12, 33/203.13; 73/66, 460, 462, 146, 570, 571, 573, 649; 702/33, 41

(56) References Cited

U.S. PATENT DOCUMENTS

| | | |
|---|---|---|
| 3,926,704 A | 12/1975 | Sharp, Jr. |
| 3,948,004 A | 4/1976 | Gruber |
| 4,095,374 A | 6/1978 | Ugo |
| 4,112,630 A | 9/1978 | Brown, Jr. |
| 4,366,707 A | 1/1983 | Jarschel ........................ 73/146 |
| 4,969,355 A | 11/1990 | Doi et al. ...................... 73/146 |
| 5,103,595 A | 4/1992 | Dale et al. |
| 5,105,547 A * | 4/1992 | Fujii ............................ 33/203 |
| 5,150,515 A * | 9/1992 | Merrill et al. ............. 33/203.12 |
| 5,321,628 A * | 6/1994 | Beebe .......................... 73/146 |
| 5,365,781 A * | 11/1994 | Rhyne .......................... 73/146 |
| 5,365,786 A | 11/1994 | Douglas ....................... 73/462 |
| 5,396,436 A | 3/1995 | Parker et al. |
| 5,645,465 A | 7/1997 | Vannan, III |
| 5,718,784 A | 2/1998 | Takamatsu |
| 5,930,881 A * | 8/1999 | Naruse et al. ............ 33/203.12 |
| 6,116,084 A | 9/2000 | Fischer et al. ................. 73/146 |
| 6,256,894 B1 | 7/2001 | Naruse et al. ............ 33/203.12 |
| 6,269,688 B1 | 8/2001 | Kroll et al. .................... 73/146 |
| 6,324,908 B1 | 12/2001 | Colarelli, III et al. ........ 73/462 |
| 6,336,364 B1 | 1/2002 | Parker et al. ................. 73/462 |
| 6,386,031 B2 | 5/2002 | Colorelli, III et al. ........ 73/462 |
| 6,389,895 B2 | 5/2002 | Colarelli, III et al. ........ 73/462 |
| 6,393,911 B2 | 5/2002 | Colarelli, III et al. ........ 73/462 |
| 6,397,675 B1 | 6/2002 | Colarelli, III et al. ........ 73/462 |
| 6,405,591 B1 | 6/2002 | Colarelli, III et al. ........ 73/462 |

OTHER PUBLICATIONS

Testing Machines for Measuring the Uniformity of Passenger Car and Light Truck Tires—SAE J332 Aug.81; Report of the Vehicle Dynamics Committee and Tire Committee; approved Jan. 1969; 3 pgs.

Tire/Vehicle Pull: An Introduction Emphasizing Plysteer Effects; Tire Science and Technology, TSTCA, vol. 18, No. 3, Jul.–Sep., 1990; pp. 170–190.

Lindenmuth, Bruce E.; Tire Conicity and Ply Steer Effects on Vehicle Performance; Society of Automotive Engineers; Automotive Engineering Congress; Feb. 25–Mar. 1, 1974.

Matyja, Frank E.; Steering Pull and Residual Aligning Torque; Tire Science and Technology, TSTCA, vol. 15, No. 3, Jul.–Sep., 1987, pp. 207–240.

* cited by examiner

Primary Examiner—Christopher W. Fulton
(74) Attorney, Agent, or Firm—Polster, Lieder, Woodruff & Lucchesi

(57) ABSTRACT

A vehicle service system configured to measure and utilize lateral force information associated with a set of vehicle wheels to provide an operator with a suggested placement for the individual vehicle wheels about the vehicle, such that the effects on the vehicle handling caused by the lateral forces are minimized.

10 Claims, 5 Drawing Sheets

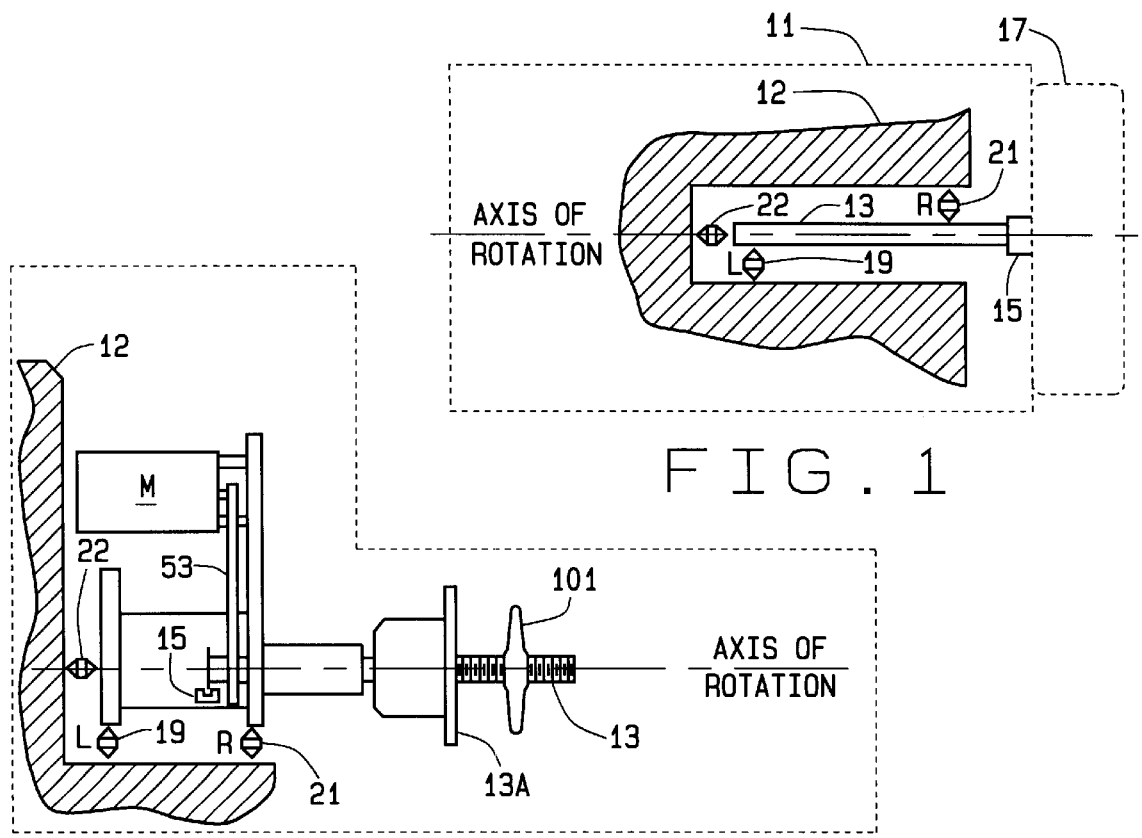
FIG. 1
FIG. 2
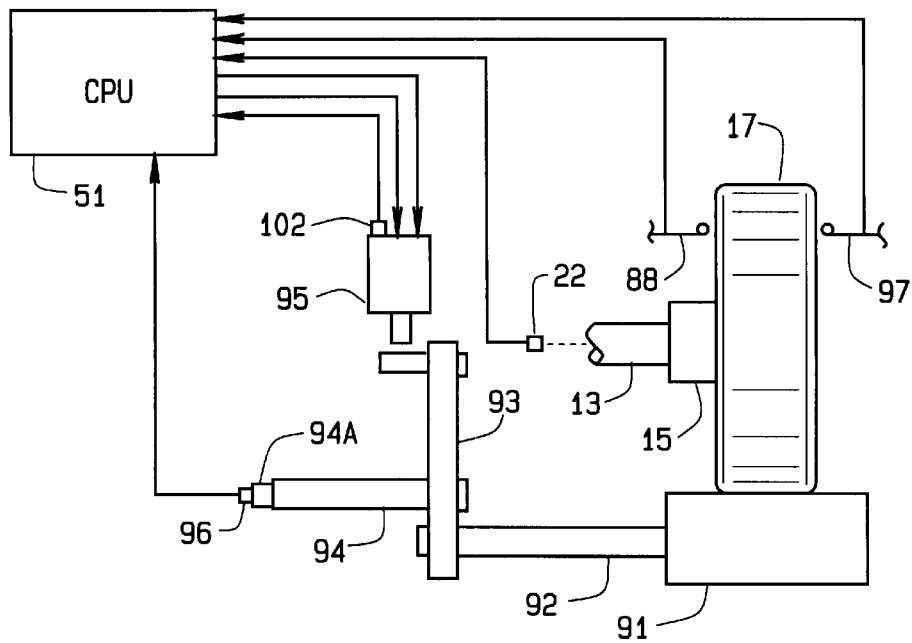
FIG. 4

VEHICLE SERVICE EQUIPMENT UTILIZING WHEEL LATERAL FORCE MEASUREMENTS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to vehicle service equipment such as is commonly utilized in vehicle repair shops, and more particularly, to improved vehicle service equipment such as wheel balancers and wheel alignment systems configured to utilize vehicle wheel lateral force measurements in the repair or adjustment of vehicle wheel and suspension systems.

The determination of unbalance in vehicle wheels, consisting of tires carried on a wheel rims, is carried out by an analysis with reference to the phase and amplitude of the mechanical vibrations caused by rotating unbalanced masses in the vehicle wheel. The mechanical vibrations are measured as motions, forces, or pressures by means of transducers, which convert the mechanical vibrations to electrical signals. Each signal is the combination of fundamental oscillations caused by imbalance and noise.

It is well known in the art that a variety of types of correction weights are available for placing on the vehicle wheel to correct the measured imbalance. For example, adhesive-backed weights, patch balance weights, and hammer-on weights are available from a number of different manufacturers.

Even when a vehicle wheel is balanced, non-uniformity in the construction of the tire as well as runout in the wheel rim can cause significant vibration forces as the wheel rolls under vehicle load. Most tire manufacturers inspect their tires on tire uniformity machines, such as disclosed in U.S. Pat. No. 6,116,084 to Fischer et al. To improve the rolling characteristics of non-uniform tires, it is common to grind rubber off the tread surface of the tires. Even after this procedure, tires will often produce vibration forces (not related to imbalance) of 20 pounds or more as they roll on a smooth road.

Some vehicle wheels develop forces in the lateral (or axial) direction when rolling straight ahead on a flat road. This condition may cause a vehicle to steer away from a straight line. Sources of lateral forces include tire conicity, ply steer, and the combination of the two, known as total lateral force. Tire conicity may be envisioned by considering a vehicle wheel to assume the shape of a truncated cone as it rolls. Based on geometry, such a configuration will always generate a force towards the apex of the cone regardless of the direction in which the vehicle wheel rotates. Thus, conicity is a force component which does not change direction with reverse rotation when measuring tire lateral residual forces. By definition:

$$Conicity = \frac{TLF_{CW} + TLF_{CCW}}{2}$$

where $TLF_{CW}$ is the total lateral force of the vehicle wheel measured in the clockwise direction, and $TLF_{CCW}$ is the total lateral force of the vehicle wheel measured in the counter-clockwise direction. Tire conicity is believed to be caused by the placement of internal tire components, such as belts off-center about the circumference of the tire, resulting in the tire having one sidewall which is stiffer than the other.

Tire ply steer lateral forces result from the influence of the plies in a tire in generating forces which can steer a vehicle from a straight line course. These forces are theorized to be related to the direction of the cords in the outermost ply, and hence, as the direction of rotation is reversed, the direction of the force generated by the outermost ply also changes. Thus tire ply steer is a force component which changes direction with reverse rotation when measuring tire lateral residual forces. By definition:

$$Plysteer = \frac{TLF_{CW} - TLF_{CCW}}{2}$$

where $TLF_{CW}$ is the total lateral force of the vehicle wheel measured in the clockwise direction, and $TLF_{CCW}$ is the total lateral force of the vehicle wheel measured in the counter-clockwise direction.

Other lateral forces which may be measured include the peak-to-peak lateral force variation, the lateral first harmonic force variation, as well as other higher lateral harmonic force variations.

The variations in radial and lateral forces during the rotation of a vehicle wheel are usually caused by differences in the stiffness and/or geometry of the vehicle wheel about its circumference or tread centerline. If these differences are slight, the radial and lateral force variations and therefore the degree of tire conicity will be insignificant and their effects unnoticeable when the vehicle wheel is installed on a vehicle. However, when these differences reach a certain level, the radial and/or lateral force variations may be significant enough to cause rough riding conditions and/or difficult handling situations. Furthermore, an excessive tire conicity value will cause a rolling tire to pull to one side.

Conditions such as tire conicity and ply steer cannot be corrected during the balancing of a vehicle wheel with the attachment of balancing weights. Temporary corrections to such conditions can be made by altering the shape of the vehicle wheel through the use of grinding machines and the remove of tire tread material from specifically identified regions on the vehicle wheel. Examples of such systems are shown in U.S. Pat. No. 3,948,004 to Gruber, U.S. Pat. No. 4,112,630 to Brown, Jr. and U.S. Pat. No. 5,645,465 to Vannan, III. However, such operations do not result in a long-term solution to the effects of lateral forces, and may result in shortened tire life as the remaining tire tread wears. Accordingly, there is a need in the industry to develop equipment capable of utilizing vehicle wheel lateral force measurements in the placement of vehicle wheels about a vehicle and in the adjustment of vehicle alignment components.

BRIEF SUMMARY OF THE INVENTION

Briefly stated, a first embodiment of the present invention is a vehicle service system configured to utilize lateral force measurement information associated with a set of vehicle wheels to provide an operator with a suggested placement for the individual vehicle wheels about the vehicle, such that the effects on the vehicle handling caused by the lateral forces are minimized.

In a second embodiment of the present invention, a vehicle service system is configured to utilize lateral force measurement information associated with a set of vehicle wheels to provide an operator with one or more suggested adjustments to the vehicle suspension components, such that the effects on the vehicle handling caused by the lateral forces are minimized.

In a third embodiment of the present invention, a vehicle wheel balancer is provided, which includes a shaft adapted for receiving a vehicle wheel, a rotation sensor assembly for measuring rotation of the shaft about its longitudinal axis, and a motor operatively connected to the shaft for rotating the shaft about its longitudinal axis, thereby to rotate the vehicle wheel. At least one vibration sensor assembly is provided for measuring the vibration of the vehicle wheel as the vehicle wheel assembly is rotated. A load roller is provided which applies a predetermined generally radial force to the vehicle wheel. At least one force sensor is provided which measures forces exerted by the vehicle wheel in the lateral (axial) direction as the load roller is in contact with the vehicle wheel. A display is provided to present the operator with a visual indication of the measured vibrations and forces exerted by the vehicle wheel, which are stored in a memory, together with the measured vibrations and forces exerted by at least one addition vehicle wheel. A computer provides the operator with suggested placement locations about a vehicle for the vehicle wheels, based upon the stored measured vibrations and forces exerted by the vehicle wheels.

In a fourth embodiment, a vehicle wheel alignment system is provided, which includes at least one vehicle wheel alignment sensor configured to measure at least one vehicle wheel alignment angle, a computer configured to receive alignment measurement data from the vehicle wheel alignment sensor, and a display through which the computer provides measurement and adjustment information to an operator. The computer is further configured to receive lateral force measurement information for at least one vehicle wheel, and to utilize the received lateral force measurement information to suggest either a placement for the associated vehicle wheel, or an adjustment to the vehicle wheel alignment, which will compensate for at least a portion of the lateral force exerted by the associated vehicle wheel when the vehicle is in motion. The lateral force measurements may be input by the operator, received from a separate piece of automotive service equipment, or may be measured by the vehicle wheel alignment system.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a diagrammatic view illustrating a generic wheel balancer suitable for use with the present invention;

FIG. 2 is a simplified top plan view of the wheel balancer of FIG. 1;

FIG. 4 is a simplified block plan view illustrating the use of the balancer of the present invention with a load roller and various measuring devices;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 3:
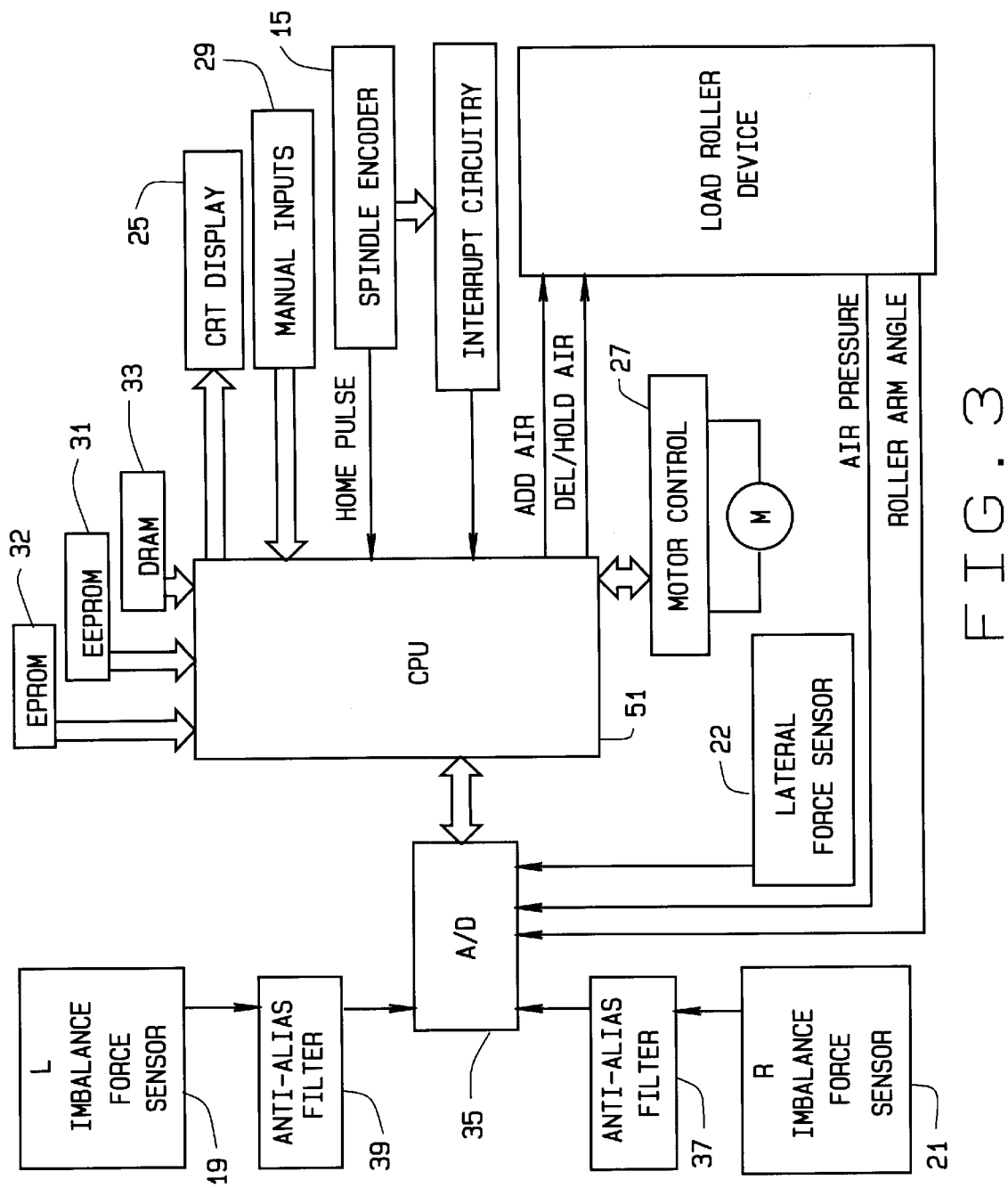
FIG. 3 is a block diagram illustrating electrical circuitry of the wheel balancer of FIGS. 1 and 2.

Turning to the drawings, FIG. 1 illustrates, in simplified form, the mechanical aspects of a generic wheel balancer 11 suitable for use with a first embodiment of the present invention. Balancer 11 includes a rotatable shaft or spindle 13 driven by a suitable drive mechanism such as a direct current 0.5 horsepower electric motor M and drive belt 53, as seen in FIG. 2. Mounted on the spindle 13 is a conventional quadrature phase optical shaft encoder 15 which provides speed and rotational position information to the circuitry of FIG. 3.

During the operation of wheel balancing, at the end of spindle 13, a vehicle wheel under test is removably mounted for rotation with the spindle hub 13A. To determine the vehicle wheel imbalance, the balancer includes at least a pair of force sensors 19 and 21, such as piezoelectric or other suitable strain gauges, mounted on the balancer base 12 and positioned to record forces generated by the spindle 13.

Turning to FIG. 2, it can be seen that the actual construction of the mechanical aspects of the balance 11 can take a variety of forms. For example, spindle 13 can include a hub 13A against which the vehicle wheel abuts during the balancing procedure. Moreover, the sensors 19 and 21 need not directly abut the spindle 13. For example, various arms or rods as shown in FIG. 2 can be used to mechanically couple the sensors to the spindle so that they are exposed to the vibrations and/or forces of the spindle.

When the vehicle wheel is unbalanced, it vibrates in a periodic manner as it is rotated, and these vibrations are transmitted to the spindle 13. The sensors 19 and 21 are responsive to these vibrations of the spindle 13. Specifically, the sensors 19 and 21 generate a pair of analog electrical signals corresponding in phase and magnitude to the vibrations of the spindle at the particular transducer locations. These analog signals are input to the circuitry of FIG. 3, which determines the required magnitudes and positions of correction weights to correct the imbalance. The operation of the various components described above, and the balancer in general, is fully described in U.S. Pat. Nos. 5,365,786 and 5,396,436, the disclosures of which are incorporated herein by reference. It should be understood that the above description is included for completeness only, and that various other circuits could be used instead.

Turning to FIG. 4, there is shown a load roller 91 suitably disposed adjacent the vehicle wheel so that it may be forced into engagement with the vehicle wheel to measure various loaded forces. More specifically, the load roller 91 is carried on a shaft 92 suitably journaled on an L-shaped arm 93 (only the lower limb of which is clearly visible in FIG. 4) designed to pivot about the axis of a shaft 94. The central processing unit (CPU) 51 of the balancer 11 causes the arm to pivot to place the load roller into engagement with the vehicle wheel by actuating an air cylinder 95 or an air bag actuator. Air pressure to cylinder 95 can be variably adjusted by CPU control. Air pressure feedback is provided by a sensor 102. The feedback enables precise load roller forces to be generated and provides a safety feature in that the CPU can detect pressure problems and remove air pressure if needed. Rotation of the shaft 94 (specifically, rotation of a magnet 94A mounted on shaft 94) is detected by a sensor 96 such as a Hall-effect sensor, and the amount of rotation is signaled to the CPU.

Figure 5:
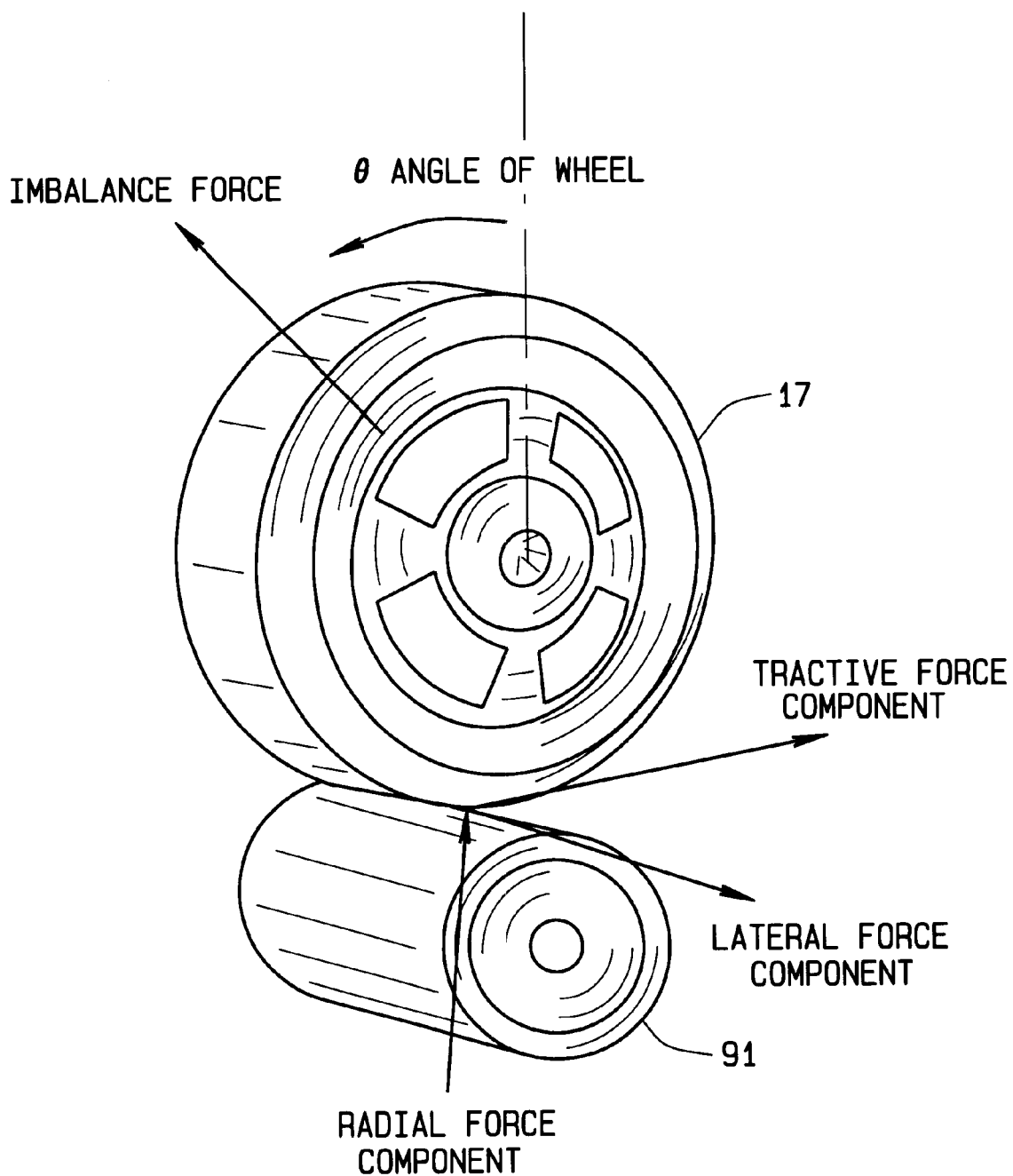
FIG. 5 is a perspective view illustrating force components involved in balancing a vehicle wheel.

Due to non-uniform construction, a vehicle wheel can have a non-zero lateral force component, as seen in FIG. 5. When a vehicle wheel with this condition is mounted on the front of a vehicle, there is a tendency for the vehicle to steer away from a straight line when driven on a flat road. By including an additional force sensor 22, which is responsive to lateral forces exerted parallel to the axis of the vehicle wheel during rotation, these lateral forces can be measured, compared to stored specifications, as well as displayed to an operator by the CPU 51. Alternatively, the CPU 51 may be placed in communication with one or more additional vehicle service devices via a network or a direct connection to communicate the lateral force measurements to such systems for use in further vehicle service procedures. Additional vehicle service devices may include, but are not limited to, vehicle wheel alignment systems or vehicle tire changers.

The third force sensor 22 may be disposed adjacent the shaft 13, to detect lateral forces along or parallel to the axis of the vehicle wheel which are transmitted by the shaft 13 during rotation. Alternatively, the third force sensor 22 may be disposed adjacent the shaft 92, upon which the load roller 91 is mounted, to detect lateral forces along or parallel to the axis of the load roller 91 which are transmitted by the shaft 92. Sensor 22 may be a conventional strain gauge, or the like, or may be a ring-shaped force transducer placed between the rotating load roller 91 and a bearing surface securing shaft 92 in place.

Lateral forces measured by the third force sensor 22 positioned adjacent shaft 13 vary from lateral forces measured when the third force sensor 22 is positioned adjacent shaft 92. The degree of variation between lateral forces measured in these two locations is due, in part, to the characteristics of the vehicle wheel under test. Specifically, as the vehicle wheel is rotated against the load roller 91, lateral and radial forces are generated at the point of contact between the vehicle wheel and the load roller 91. Lateral forces exerted on the load roller 91 may be measured by the sensor 22 positioned adjacent the shaft 92. However, if the sensor 22 is positioned adjacent the shaft 13, the lateral forces exerted at the load roller/vehicle wheel interface must be first transferred through the carcass of the vehicle wheel, and then through shaft 13, resulting in an attenuation. The attenuation of the lateral force between the load roller/vehicle wheel interface, and the shaft 13, is the result of a portion of the lateral force causing the tire carcass to flex or bend during rotation.

In an alternative embodiment, a force sensor 22A is placed to measure lateral forces along or parallel to the shaft 13, while an additional force sensor 22B is placed to measure lateral forces along or parallel to the shaft 92. By utilizing signals representative of lateral forces measured at each sensor 22A and 22B during the rotation of a vehicle wheel against the load roller 91, the CPU 51 may be configured to identify one or more characteristics of the vehicle wheel undergoing test, including a measure of the amount flex the tire carcass experiences during rotation.

If the axis of the load roller and the axis of the mounted vehicle wheel vary from parallel even by a small amount, a perfectly uniform vehicle wheel may falsely have a larger average lateral force measurement observed by force sensor 22. By measuring changes in lateral forces between different vehicle wheels, meaningful information can still be obtained and displayed even if the roller and wheel mounting spindles are not parallel. Furthermore, the ability to rotate the vehicle wheel in both directions is also useful in measuring the lateral forces on a vehicle wheel. The magnitude of lateral force on some vehicle wheels remains nearly constant and in the same direction as the vehicle wheel is rotated both clockwise and counterclockwise. Vehicle wheels with different construction defects may have a component of the lateral force reverse direction when the rotational direction is reversed.

Where lateral force measurements which are associated with more than one vehicle wheel are obtained by the CPU 51, it is preferred that an associated vehicle wheel identifier accompany each lateral force measurement value. For example a first set of lateral force measurements, consisting of measurements of one or more of the following: tire conicity; tire ply-steer; tire peak-to-peak lateral force variation; or lateral force harmonics is preferably associated with a vehicle wheel serial number or other unique vehicle wheel identifier, which may be input by an operator.

It is further preferable that the CPU 51 be configured to track the placement of each individual wheel in a set of wheels about the vehicle. Placement tracking may be handled either by requiring that vehicle wheel lateral force measurements and unique vehicle wheel identifiers be received by the CPU 51 in a predetermined order; for example, clockwise about the vehicle, starting with the front right vehicle wheel position and ending with the front left vehicle wheel position; or that a vehicle wheel placement indicator be received by the CPU 51 for each input set of lateral force measurements; i.e. LF for left front, RR for right rear, etc.

Using the unique vehicle wheel identifier, together with the vehicle wheel placement information, the CPU 51 can keep track of which lateral force measurements are associated with each individual vehicle wheel placed on the vehicle, and can recommend to an operator preferred placement locations about the vehicle for each vehicle wheel so as to result in a minimization of the net lateral force exerted on the vehicle by the vehicle wheels during vehicle travel. Such information can be displayed directly to the operator on a display or other output device linked to the CPU 51, or may be communicated electronically to other vehicle service devices, such as a vehicle wheel alignment system, for subsequent display or utilization.

Figure 6:
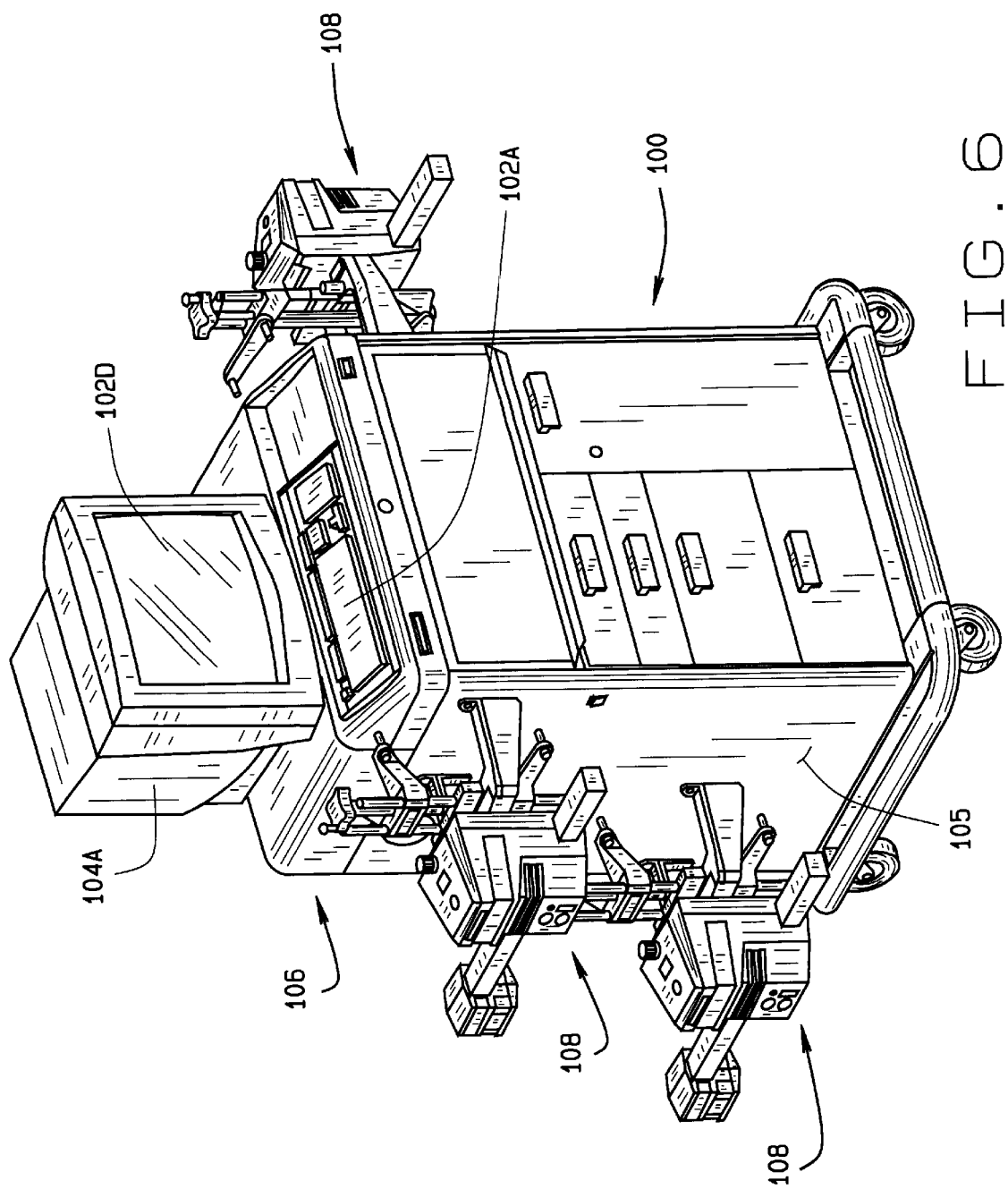
FIG. 6 is a perspective view of a vehicle wheel alignment system suitable for use with the present invention.

Turning to the drawings, FIG. 6 illustrates, in simplified form, the mechanical aspects of a generic vehicle wheel alignment system 100 suitable for use with a second embodiment of the present invention. The vehicle alignment system 100 includes at least one input device 102, such as a keyboard 102A, mouse 102B, microphone 102C, or touch screen 102D, for use by an operator or technician (not shown) to communicate with the vehicle alignment system 100, and at least one output device 104, such as a display 104A or audio speaker 104B for the vehicle wheel alignment system 100 to convey information to the operator or technician. Depending upon the needs of the operator or technician, the input devices 102 and output devices 104 can be integrated together in a central console 105, in a portable device, or located separately, again depending upon the needs of the operator and the configuration of the wheel alignment system 100.

The input devices 102 and output devices 104 are in communication with a CPU 106 such as a wheel alignment computer, operating under control of one or more software programs or software objects. The CPU 106 can be any computing device used with systems of complexity similar to that of a vehicle wheel alignment system. For example, a micro-processor, a micro-controller, a digital signal processor having sufficient computing power, or a general purpose computer can be used as the CPU 106. Of course, any equivalent device, i.e. one capable of executing the requisite software programs or software objects, can also be used.

Communication between the input devices 102, output devices 104, and the CPU 106 can be performed electronically or electro-magnetically (including optical communications such as infrared system), or by any combination thereof. The computing device 106 of the vehicle wheel alignment system 100 is additionally in communication with one or more sensing devices 108 for obtaining measurements of the various wheel alignment angles and/or characteristics of a vehicle under test, such as those shown in U.S. Reissue Pat. No. 33,144 to Hunter et al., U.S. Pat. No. 5,598,357 to Colarelli et al, and U.S. Pat. No. 4,381,548 to Grossman et al., the disclosures of which are incorporated herein by reference.

The sensing devices 108, depending upon the application and requirements, can be electronic, electromechanical, or active or passive optical alignment targets such as those disclosed in U.S. Pat. No. 5,535,522 to Bernie F. Jackson, and U.S. Pat. No. 5,675,515, to Daniel B. January. The sensing devices 108 can be hard-wired to the CPU 106 for communication therewith, or can be in communication with the CPU 106 in any other suitable manner, such as through infrared, optical, or radio-frequency communication.

In addition to the input devices 102, output devices 104, and sensing devices 108, the CPU 106 of the vehicle wheel alignment system 100 can be configured with access to an internal or external data storage component (collectively identified as 120), and to various peripheral components, such as printers, CD-ROM drives, DVD-drives, and/or a communications network such as the Internet or a local micro-network.

In an embodiment of the present invention, the CPU 106 of the aforementioned vehicle wheel alignment system 100 is further configured to receive and utilize lateral force measurements associated with one or more vehicle wheels, during a vehicle wheel alignment service procedure. Lateral force measurements may be input manually to the CPU 106 by an operator through an input device 102, or may be received over a communications link or network from a remote vehicle service system, such as a vehicle wheel balancer system of the type previously described herein.

Particularly in situations wherein lateral force measurements which are associated with more than one vehicle wheel are received by the CPU 106, it is preferred that an associated vehicle wheel identifier accompany each lateral force measurement value. For example a first set of lateral force measurements, consisting of measurements of one or more of the following: tire conicity; tire ply-steer; tire peak-to-peak lateral force variation; or lateral force harmonics is preferably associated with a vehicle wheel serial number or other unique vehicle wheel identifier.

It is further preferable that the CPU 106 be configured to track the placement of each individual wheel about the vehicle. Placement tracking may be handled either by requiring that vehicle wheel lateral force measurements and unique vehicle wheel identifiers be received by the CPU 106 in a predetermined order; for example, clockwise about the vehicle, starting with the front right vehicle wheel position and ending with the front left vehicle wheel position; or that a vehicle wheel placement indicator be received by the CPU 106 for each input set of data; i.e. LF for left front, RR for right rear, etc.

Using the unique vehicle wheel identifier, together with the vehicle wheel placement information, the CPU 106 can keep track of which lateral force measurements are associated with each individual vehicle wheel placed on the vehicle undergoing an alignment service.

The CPU 106 of the improved vehicle wheel alignment system 100 is further configured to utilize the received vehicle wheel lateral force measurement information during a vehicle wheel alignment service. In a first embodiment, the CPU 106 is configured to provide the operator with a suggested placement about the vehicle for each vehicle wheel for which a lateral force measurement was received. The CPU 106 identifies each suggested placement location based upon one or more parameters such as vehicle wheel alignment specifications, vehicle wheel alignment measurements as recorded by sensors 108, received lateral force measurements for individual vehicle wheels, and any operator input placement preferences or restrictions.

In one embodiment, the CPU 106 is configured to suggest placement of vehicle wheels about the vehicle for improved vehicle handling utilizing only the received lateral force measurements for each individual wheel. Specifically, the CPU 106 is configured to identify placement locations for each vehicle wheel so as to minimize the sum of the lateral forces acting upon each axle of the vehicle. Information identifying each vehicle wheel, individual and total lateral force measurements, and suggested placement about the vehicle is provided to an operator on a display 104A, and example of which is seen in FIG. 6.

In a second embodiment, the CPU 106 is configured to suggest placement of vehicle wheels about the vehicle for improved vehicle handling utilizing the received lateral force measurements for each individual wheel together with vehicle wheel alignment specifications and measurement data. Specifically, the CPU 106 is configured to first identify alignment component adjustments required to bring a vehicle into conformance with a set of alignment specifications as is conventional. Next, using the received lateral force measurements, the CPU 106 identifies placements for each vehicle wheel wherein the lateral force exerted by the vehicle wheel will counter or offset at least a portion of any steering or handling characteristics of the vehicle caused by misaligned alignment components. The CPU 106 then identifies any remaining alignment component adjustments required to bring the vehicle into conformance with the set of alignment specifications. Information identifying each vehicle wheel, individual and total lateral force measurements, alignment specifications and measurements, and suggested placement about the vehicle is provided to an operator on a display 104A, and example of which is seen in FIG. 6.

Alternatively, the CPU 106 may be configured to identify alignment component adjustments which will improve the handling or steering of a vehicle which is adversely affected by vehicle wheel lateral forces, regardless of the conformance of the vehicle alignment measurements with a set of vehicle alignment specifications. Such a configuration is particularly useful for altering the steering and handling characteristics of a vehicle which is in conformance with the manufacturer's alignment specifications, but continues to exhibit undesirable steering or handling characteristics on the road as a result of vehicle wheel lateral forces. When utilized in this manner, the CPU 106 first obtains the current vehicle wheel alignment measurements from the sensors 108 in the conventional manner. Vehicle wheel lateral forces are then received, and the CPU 106 first determines if the individual vehicle wheels are placed about the vehicle so as to minimize the sum of the vehicle wheel lateral forces on each axle. If the CPU 106 determines that the net lateral forces are not minimized, an optimal placement for each vehicle wheel is then calculated and displayed to the operator as described above.

If the vehicle wheel placement is already in an optimal configuration, and the vehicle alignment measurements are within specification, the CPU 106 next determines and displays to the operator one or more alignment component adjustments which will reduce or offset the remaining net lateral forces exerted on the vehicle by the vehicle wheels. It will be recognized that the CPU 106 may identify or suggest to the operator alignment adjustments which will result in the vehicle alignment measurements falling outside of the manufacturer's specifications. Such a condition is, however, desirable if the handling and/or steering characteristics of the vehicle are improved by the identified or suggested adjustments.

As previously described, the CPU 106 of the vehicle wheel alignment system 100 of the present invention is configured to receive lateral force measurements for one or more vehicle wheels either through operator input or over a communications link from a networked remote vehicle service device. In an alternative embodiment of the present invention, a vehicle wheel alignment system 200, shown in FIG. 7, is adapted to include at least the minimal components of a vehicle wheel balancer, of the type previously described, so as to provide the CPU 206 with access to components for the direct measurement of vehicle wheel lateral forces.

Figure 7:
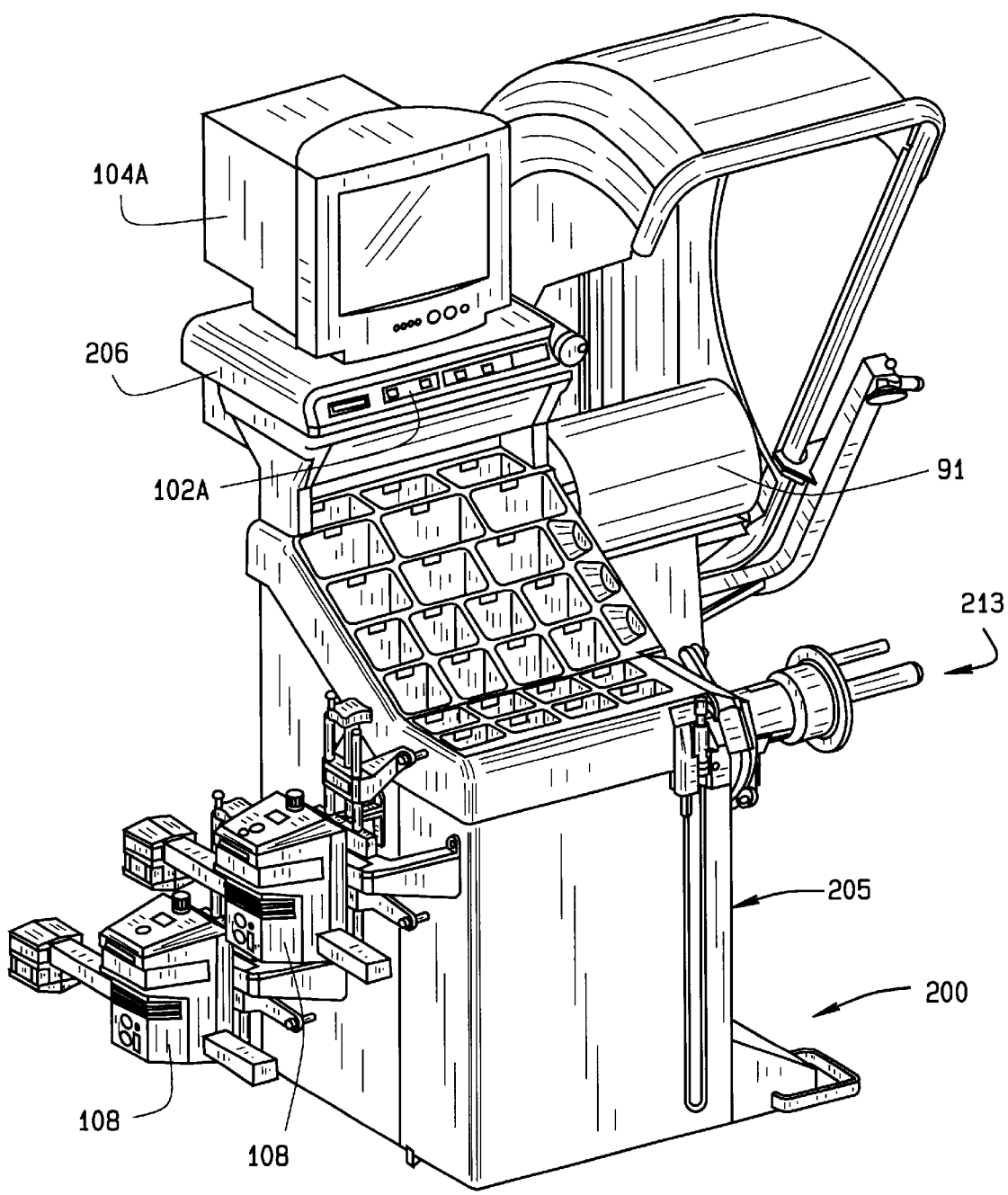
FIG. 7 is a perspective view of a combination vehicle wheel alignment system and vehicle wheel balancing system.

For example, as shown in FIG. 7, a console 205 of the vehicle wheel alignment system 200 is provided with suitable support for the mounting thereon of a rotatable shaft or spindle 213 for receiving a vehicle wheel, driven by a suitable drive mechanism, comprising the same components shown in FIG. 4. A load roller 91 is carried on a shaft 92 suitably journaled on an L-shaped arm 93 designed to pivot about the axis of a shaft 94. The CPU 206 of the wheel alignment system 200 is configured to causes the arm to pivot to place the load roller into engagement with a vehicle wheel secured to the shaft 213, by actuating an air cylinder 95 or an air bag actuator. Air pressure to cylinder 95 can be variably adjusted by CPU control in the same manner as described above in the context of a vehicle wheel balancer. Lateral forces generated by a rotating vehicle wheel mounted to shaft 213 are measured by either a force sensor 22A placed to measure lateral forces along or parallel to the shaft 213, or a force sensor 22B placed to measure lateral forces along or parallel to the shaft 92, as described above. Alternatively, force sensors 22A and 22B may both be utilized in combination to provide data to the CPU 206 indicative of lateral forces generated by the vehicle wheel undergoing test. Those of ordinary skill in the art will readily recognize that the CPU 206 of the vehicle wheel alignment system 200 can be configured to process the signals received from force sensors 22A and/or 22B in the same manner as the CPU 51 of the wheel balancer system previously described.

Incorporating the hardware components required to provide a measurement of vehicle wheel lateral forces into a vehicle wheel alignment system provides several advantages. For example, during a vehicle wheel alignment operation, lateral force measurements for the wheels of a vehicle may be easily obtained without the need to transport the wheels to another location within the shop. Additionally, the obtained lateral force measurements will be received by the CPU 206 of the vehicle wheel alignment system without requiring an operator to input the measurements, thereby reducing operator induced errors.

In a further alternative embodiment, the vehicle wheel alignment system 200 may be further provided with additional force sensors corresponding in placement and function to force sensors 19 and 21 in the vehicle wheel balancer system described above, and CPU 206 provided with suitable software to perform a complete vehicle wheel imbalance analysis of both radial and lateral forces generated by rotating vehicle wheel mounted to shaft 213. Such a combination of vehicle wheel alignment system and vehicle wheel balancer can provide a reduction in the required floor space of a vehicle repair shop normally occupied by both a vehicle wheel balancer and a vehicle wheel alignment system, as well as offer the convenience of having both types of systems located at a single vehicle service point, further facilitating the use of vehicle wheel lateral force measurements during a vehicle wheel alignment operation.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved vehicle service system having a central processor, and an output device operatively connected to the central processor, the improvement comprising:

the central processor configured to utilize at least one lateral force measurement associated with each vehicle wheel in a set of vehicle wheels to calculate a lateral force effect on a vehicle for each possible arrangement of said set of vehicle wheels about said vehicle; and wherein said central processor is further configured to utilize each of said calculated lateral force effects on said vehicle to provide, to an operator through said output device, a suggested placement of individual wheels in said set of vehicle wheels about said vehicle, such that an effect on the handling of said vehicle caused by said lateral force effect is minimized.

2. The improved vehicle service system of claim 1 wherein said vehicle service system is a vehicle wheel balancer.

3. The improved vehicle service system of claim 1 wherein said vehicle service system is a vehicle wheel alignment system.

4. The improved vehicle service system of claim 1 wherein said vehicle service system is a vehicle tire changer adapted for installation and removal of tires on vehicle wheel rims.

5. An improved vehicle service system having a central processor, and an output device operatively connected to the central processor, the improvement comprising:

the central processor configured to utilize at least one lateral force measurement associated with at least one vehicle wheel to provide, to said operator through the output device, a suggested placement for said at least one vehicle wheel about said vehicle, such that an effect on the handling of said vehicle caused by said at least one lateral forces is minimized; and the central processor configured to utilize said at least one lateral force measurement associated with said at least one vehicle wheel to provide, to an operator through said output device, at least one suggested adjustment to one or more vehicle suspension components, such that residual effects on the handling of said vehicle caused by said at least one lateral force is further reduced.

6. The improved vehicle service system of claim 5 wherein said vehicle service system is a vehicle wheel alignment system.

7. The improved vehicle service system of claim 6 wherein the central processor is further configured to utilize one or more vehicle wheel alignment measurements together with said at least one lateral force measurement associated with at least one vehicle wheel to provide, to said operator through the output device, said suggested placement for said at least one vehicle wheel about said vehicle, such that an effect on the handling of said vehicle caused by said at least one lateral forces is minimized.

8. The improved vehicle service system of claim 5 wherein said at least one suggested adjustment to one or more vehicle suspension components alters a vehicle wheel alignment angle of said vehicle.

9. An improved vehicle wheel alignment system having a console, a central processing unit, at least one alignment sensor in communication with the central processing unit, at least one input device linked to the central processing unit, and at least one output device linked to the central processing unit, the improvement comprising:

a shaft adapted for receiving a vehicle wheel, said shaft having a longitudinal axis and being rotatable about said axis so as to rotate a vehicle wheel removably mounted thereon;

a motor operatively connected to said shaft for rotating said shaft about said axis, thereby to rotate said vehicle wheel;

a load roller for applying a generally radial force to said vehicle wheel during rotation of said vehicle wheel;

a sensor for measuring a lateral force exerted parallel to said longitudinal axis during rotation of said vehicle wheel;

wherein said central processing unit is responsive to said measure of lateral force to provide information relating to the measured lateral force to an operator; and wherein said central processor configured to utilize said measure of lateral force to recommend one or more alignment adjustments.

10. The improved vehicle wheel alignment system of claim 9 wherein the improvements further include:

a sensor assembly for measuring rotation of said shaft about said longitudinal axis;

at least one vibration sensor assembly for measuring vibration of said vehicle wheel as said vehicle wheel is rotated; and wherein said central processing unit is further responsive to said measured vibration of the vehicle wheel to determine vehicle wheel imbalance.

* * * * *